UNITED STATES PATENT OFFICE.

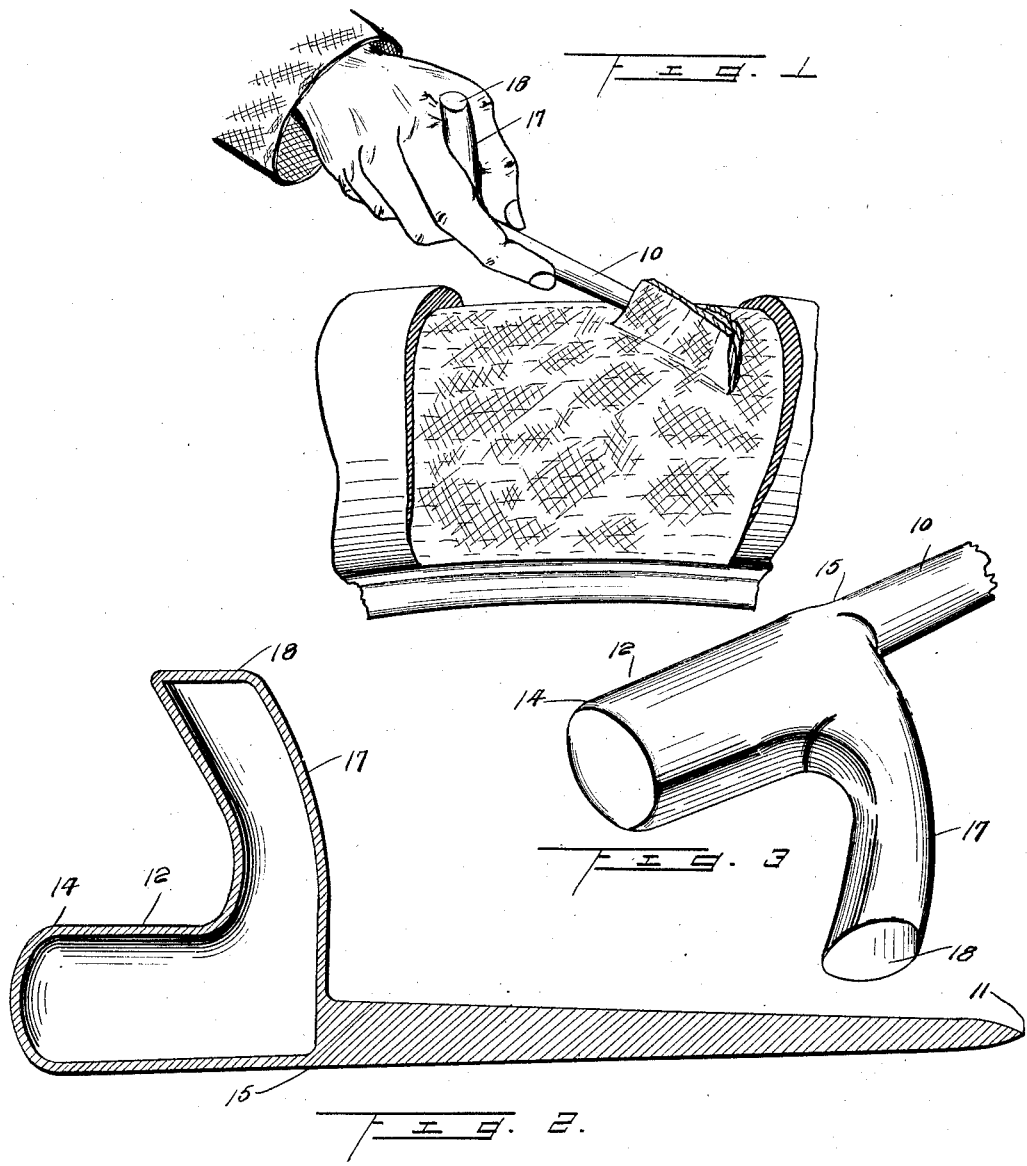

WILLIAM F. ATKINSON, OF BAKERSFIELD, CALIFORNIA.

TIRE-TOOL.

1,389,114.  Specification of Letters Patent.  Patented Aug. 30, 1921.

Application filed November 17, 1920. Serial No. 424,782.

*To all whom it may concern:*

Be it known that I, WILLIAM F. ATKINSON, a citizen of the United States, residing at Bakersfield, in the county of Kern and State of California, have invented certain new and useful Improvements in a Tire-Tool; and I do hereby declare the following to be a full, clear, and exact description of the invention, such as will enable others skilled in the art to which it appertains to make and use the same.

This invention relates to a tire tool, and more particularly to a tool designed for use as an awl when vulcanizing a tire, or prior to that operation, for separating the layers of the material of which the tire is formed.

A further object is to provide a tool which may be termed a fabric awl, and which shall include a spindle portion, gradually tapered to form the point, and which shall also include a handle of particular construction, whereby the awl may be firmly grasped between the thumb and fingers, and in a position insuring a maximum degree of effectiveness in use.

A still further object is to provide, in a tool of this character, a handle distinguished from the usual round handle by the addition of an offset portion and by the provision of a heavier or widened end portion beyond the offset.

With the foregoing and other objects in view, the invention consists in the novel construction, combination, and arrangement of elements hereinafter described and claimed.

In the accompanying drawing:

Figure 1 is a perspective view of the device, illustrating the manner in which the tool is adapted to be used.

Fig. 2 is a view in longitudinal section through the spindle, or shank portion, and the heavier end portion of the handle, and Fig. 3 is a perspective view illustrating the formation of the handle of the tool, the spindle or shank of the tool being broken away.

In carrying out my invention, I provide a spindle or shank portion designated 10, gradually tapering toward the point 11, the opposite end being heavier and provided with a rounded portion 12. This end is also of greater cross section, providing a portion 14 having rounded or curved surfaces, one surface 15 merging into the tapered portion of the shank or spindle.

An offset portion designated 17 extends from the point of juncture of the main shank and the heavier portion of the handle, this offset portion being curved as shown and provided with the end portion 18. All surfaces of the offset portion and handle proper are curved or rounded, and the device is readily grasped in the hand in the manner shown in the drawing, and a firm grip is secured thereon, so that the tool may be used in the most effective manner in separating the layers of fabric, etc., as an incident to the vulcanizing operation.

This device may be made entirely of steel, or the handle portion may be formed of iron, and in that event would be made hollow, for reducing the weight. That portion of the offset member constituting the inner side of the curve snugly fits the hand between the thumb and fore finger, when the device is in use.

Having thus described the invention, what I claim is:—

1. A device of the class described comprising a shank portion having a tapered point, and a handle including an offset portion and a straight portion, the latter extending in approximate alinement with the shank.

2. A device of the class described, comprising a shank portion having a tapered point, and a handle including a straight end portion and a curved offset portion projecting from the straight portion and formed with a curved edge fitting the hand between the thumb and fore finger.

3. A device of the class described, comprising a shank portion and point, and a handle formed integrally with the shank portion and having a portion of the surface in alinement therewith, said element having a rounded end for fitting the hand, and an offset portion curved with reference to the remainder of the handle and the shank, and having a rounded surface.

4. A device of the class described, comprising a shank portion circular in cross section and tapered from one end to the opposite end, and a handle including a relatively heavy portion and a curved element extending therefrom, the heavy portion being adapted for reception by the palm of the hand, and the curved portion coöperating with that portion of the hand between the thumb and forefinger.

In testimony whereof I affix my signature in presence of two witnesses.

WILLIAM F. ATKINSON.

Witnesses:
JAMES A. SEARS,
WILL H. MATHEWS.